United States Patent
Mandaleeka et al.

(10) Patent No.: US 10,243,875 B2
(45) Date of Patent: Mar. 26, 2019

(54) CLOUD SERVICE MANAGEMENT SYSTEM

(71) Applicant: Hewlett-Packard Development Company, L.P., Houston, TX (US)

(72) Inventors: Lakshminarayana Mandaleeka, Santa Clara, CA (US); Travis S. Tripp, Fort Collins, CO (US); Stephane Herman Maes, Fremont, CA (US); Rheid Schloss, Fort Collins, CO (US); Serdar Badem, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 640 days.

(21) Appl. No.: 14/646,857

(22) PCT Filed: Dec. 3, 2012

(86) PCT No.: PCT/US2012/067593
§ 371 (c)(1),
(2) Date: May 22, 2015

(87) PCT Pub. No.: WO2014/088542
PCT Pub. Date: Jun. 12, 2014

(65) Prior Publication Data
US 2015/0304240 A1 Oct. 22, 2015

(51) Int. Cl.
*G06F 15/173* (2006.01)
*H04L 12/911* (2013.01)
(Continued)

(52) U.S. Cl.
CPC .......... *H04L 47/783* (2013.01); *G06F 9/5072* (2013.01); *H04L 67/10* (2013.01)

(58) Field of Classification Search
CPC ...... H04L 47/783; H04L 67/10; G06F 9/5072
See application file for complete search history.

(56) References Cited

U.S. PATENT DOCUMENTS 6,880,002 B2    4/2005 Hirschfeld et al.
9,584,445 B2 *  2/2017 Stubberfield ......... H04L 49/354
(Continued)

FOREIGN PATENT DOCUMENTS

CN    102176723 A    9/2011
CN    102447743      5/2012

OTHER PUBLICATIONS

Duvall, P., "Agile DevOps: Infrastructure Automation," (Web Page), Sep. 11, 2012, 8 pages, available at http://www.ibm.com/developerworks/agile/library/a-devops2/index.html.
(Continued)

*Primary Examiner* — Krisna Lim
(74) *Attorney, Agent, or Firm* — Hewlett Packard Enterprise Patent Department

(57) ABSTRACT

A system includes a cloud computing system. The cloud computing system includes a continuous delivery system to enable design and deployment of a cloud service in the cloud computing system. The cloud computing system also includes a cloud services system to enable access and consumption of a service offering associated with the cloud service by a user. The cloud computer system further includes a cloud service management system that is executed on a non-transitory computer readable medium. The cloud service management system can integrate the continuous delivery system and the cloud services system over the cloud computing system to provide the design and the deployment of the cloud service and publication of the cloud service to the cloud services system.

17 Claims, 3 Drawing Sheets

(51) Int. Cl.
*G06F 9/50* (2006.01)
*H04L 29/08* (2006.01)

(56) References Cited

U.S. PATENT DOCUMENTS

| | | | | |
|---|---|---|---|---|
| 2011/0119088 A1* | 5/2011 | Gunn | G06F 19/322 | 705/3 |
| 2011/0231899 A1* | 9/2011 | Pulier | G06F 9/45558 | 726/1 |
| 2011/0246627 A1* | 10/2011 | Kern | G06F 9/5072 | 709/220 |
| 2011/0246992 A1* | 10/2011 | Kern | G06F 9/5072 | 718/100 |
| 2012/0016778 A1* | 1/2012 | Salle | G06F 9/5072 | 705/27.1 |
| 2012/0096525 A1* | 4/2012 | Bolgert | G06F 11/3065 | 726/6 |
| 2012/0124211 A1* | 5/2012 | Kampas | G06F 9/50 | 709/226 |
| 2012/0204169 A1* | 8/2012 | Breiter | G06F 9/44526 | 717/171 |
| 2012/0258777 A1* | 10/2012 | Huang | H04W 4/003 | 455/557 |
| 2012/0266168 A1 | 10/2012 | Spivak et al. | | |
| 2012/0290647 A1* | 11/2012 | Ellison | H04L 41/0233 | 709/203 |
| 2013/0066940 A1* | 3/2013 | Shao | H04L 67/1025 | 709/201 |
| 2013/0080509 A1* | 3/2013 | Wang | H04L 12/66 | 709/203 |
| 2013/0219006 A1* | 8/2013 | Kuo | H04L 67/2814 | 709/213 |
| 2013/0219505 A1* | 8/2013 | Xue | G06F 21/10 | 726/26 |
| 2013/0254847 A1* | 9/2013 | Adams | G06F 21/6218 | 726/4 |
| 2013/0283364 A1* | 10/2013 | Chang | H04L 49/70 | 726/12 |
| 2014/0244851 A1* | 8/2014 | Lee | H04L 12/4641 | 709/228 |
| 2014/0289791 A1* | 9/2014 | Acharya | H04L 63/0236 | 726/1 |
| 2015/0081885 A1* | 3/2015 | Thomas | G06F 9/45558 | 709/224 |
| 2016/0308762 A1* | 10/2016 | Teng | H04L 45/50 | |

OTHER PUBLICATIONS

Erez, S. et al., "Agility, Efficiency and Innovation Through Continuous Application Management," (Research Paper), Jun. 24, 2012, 28 pages, available at http://www.slideshare.net/justindorfman/develop-deploy-and-manage-tomorrows-applicationstoday-presentation-.

International Search Report & Written Opinion received in PCT Application No. PCT/US2012/067593, dated Jun. 3, 2013, 9 pages.

Team, V., 5 Ways It Benefits From the New Cloud Operating Model, (Web Page), Aug. 16, 2012, 2 pages, available at http://blogs.vmware.com/vfabric/2012/08/5-ways-it-benefits-from-the-new-cloud-operating-model.html.

Weisman, R., "How Automation Enables the DevOps Model," (Web Page), Jan. 31, 2012, 4 pages, available at http://blog.zenoss.com/2012/01/how-automation-enables-the-devops-model/.

Office Action received for European Application No. 12889437.5, dated Aug. 1, 2017, 7 pages.

International Preliminary Report on Patentability received for PCT Patent Application No. PCT/US2012/067593, dated Jun. 18, 2015, 6 pages.

European Search Report and Search Opinion Received for EP Application No. 12889437.5, dated Jun. 10, 2016, 7 pages.

"HP Continuous Delivery Automation, for the Windows ® and Linux operating systems", Software Version 1.30, Dec. 2013, 393 pages.

"Cloud Service Automation: For Microsoft Windows® and Linux operating systems", Cloud Service Management Console Help, Software version: 4.80, Jan. 2017, 362 pages.

* cited by examiner

CLOUD SERVICE MANAGEMENT SYSTEM

BACKGROUND

Cloud computing refers to the delivery of scalable and pooled computing, storage, and networking capacity as a service to a network of end-recipients. The name comes from the use of clouds as an abstraction for the complex infrastructure of networks and associated hardware operative within the cloud. Cloud computing provides, for example, services for a user's data, software, and computation over a network. Such computing capability relies on sharing of resources to achieve coherence and economies of scale over a network (typically the Internet). For example, cloud computing can also refer to applications or platforms to support applications offered with a similar utility model for revenue or for private usage. Services deployed on resources supporting the cloud presently often have to be manually deployed, which can consume considerable administrative time. The manual steps of deploying a cloud service can include the provisioning and instantiation of the infrastructure, which can require linking the installation of the cloud service to the full knowledge of the deployed infrastructure. Manual deployment typically requires numerous sequences of steps usually launched by the user who attempts to deploy the cloud service.

DETAILED DESCRIPTION

Figure 1:
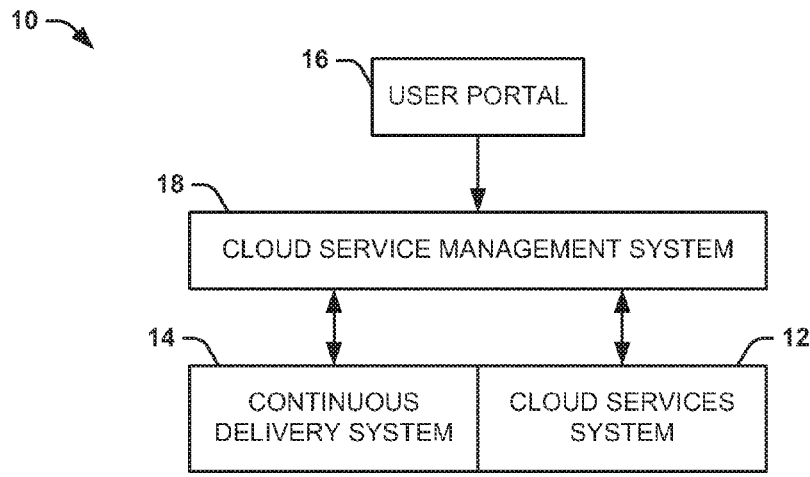
FIG. 1 illustrates an example of a cloud computing system.

FIG. 1 illustrates an example of a cloud computing system 10. The cloud computing system 10 can correspond to a distributed network system within which network resources (e.g., cloud services) can be distributed for access and consumption by one or more users of the cloud computing system 10. As described herein, a "user" or "users" can be described as any person or persons that interact with the cloud computing system 10 for any reason, and can include but is not limited to a cloud service provider, a cloud service designer, and/or a cloud service consumer. It is to be understood that the reference to a "user" or "users", as described herein, may not be consistently referring to the same entity or entities. As described herein, "cloud services" can refer to any of a variety of computing applications that can be accessed, implemented, or consumed on or across a cloud computing environment, such as the cloud computing system 10. For example, cloud computing system 10 can include storage, computing, and network resources and capabilities that are that can be available as services along with other cloud services, such as platform services and applications. The cloud computing system 10 can be hosted on a network, such as a public network (e.g., the Internet), a private network, a managed network environment, or a combination of different network types. As disclosed herein, the components of the cloud computing system 10 can be implemented, for example as machine readable instructions stored on a memory resource. In such a situation, the memory resource can be implemented, for example, as a volatile memory (e.g., random access memory), non-volatile memory (e.g., a hard drive, a solid state drive, flash memory, etc.). Moreover, the cloud computing system 10 can include a processing resource (e.g., a processor core) to access the memory resource and execute the machine readable instructions. Moreover, in the present examples, the memory resource and the processing resource could be stored a single machine (e.g., a computer) or across multiple computers (via a network).

Cloud services can be accessed and consumed via a cloud services system 12 that can correspond to one or more software programs that can be accessed locally or remotely with respect to a user instantiating a user portal, such as a service portal. The user portal can be implemented are elements of the cloud services system 16 provide an interface with a user (e.g., via a graphical user interface (GUI)) and/or an interface with another application (via an application programming interface (API)). As described herein, the cloud services system 12 can correspond to any of a variety of software and/or firmware implementations that communicate with remote and/or local databases and cloud service platforms to allow a user to access, consume, and customize cloud services; manage catalogs and/or subscriptions of cloud services; set access, approvals, and pricing of cloud services, and/or integrate cloud services with third party service management systems. As an example, the cloud services system 12 can include one or more programs, such as HP Cloud Service Automation (HP CSA) available from the HEWLETT-PACKARD® Company.

In the example of FIG. 1, the cloud computing system 10 also includes a continuous delivery system 14 that can be configured to allow the design and deployment cloud services onto the cloud computing system 10, such as can be accessed, consumed, and managed via the cloud services system 12. As described herein, the continuous delivery system 14 can correspond to any of a variety of software and/or firmware implementations that can communicate through the network infrastructure with the cloud computing system 10 to allow the design and deployment of cloud services, model infrastructure and application requirements, and/or to manage versions, configurations and other application components for enabling automated management and application portability, such as across different development environments. The deployment of the cloud services via the continuous delivery system 14 can provide algorithms and/or criteria to match infrastructure models with application requirements, such that the continuous delivery system 14 can be especially suited for DevTest and DevOps applications. As an example, the continuous delivery system 14 can include one or more programs, such as HP Continuous Delivery Automation (HP CDA) likewise available from the HEWLETT-PACKARD® Company. In the example of FIG. 1, a user can access a user portal 16 to access and/or utilize the continuous delivery system 14 for the design and/or deployment of the cloud services locally or remotely with respect to network infrastructure. While the example of FIG. 1 demonstrates the user portal 16 for accessing the cloud computing system 10, the cloud computing system 10 is not limited to use of the user portal 16 for access. Instead, a user can programmatically access portions of the cloud computing system 10, such as to access and/or utilize the continuous delivery system 14 for the design and/or deployment of the cloud services, via application programming interfaces (APIs).

The cloud computing system 10 further includes a cloud service management system 18. The cloud service management system 18 is demonstrated as being in communicative contact with the cloud services system 12, the continuous delivery system 14, and the user portal 16, and can be configured to integrate functionality associated with both the cloud services system 12 and the continuous delivery system 14. For example, the cloud service management system 18 can provide the user with the capability to design and deploy a given cloud service using the continuous delivery system 14 (e.g., a service design system associated with the continuous delivery system 14) and to publish the cloud service to the cloud services system 12, all via the user portal 16. As an example, the cloud service management system 18 can implement an adapter system that can implement communication protocols of both the cloud services system 12 and the continuous delivery system 14. For example, the cloud management system 18 can implement the associated adapter system to adapt the designs of infrastructure models/provisioning, platform provisioning and/or applications deployment (e.g., via the continuous delivery system 14) to the cloud services system 12. Therefore, the cloud management system 18 can develop a cloud service blueprint that is executable via the cloud services system 12 and which interfaces with and is driven by the continuous delivery system 14. Accordingly, the associated cloud services can be offered by the cloud services system 12 via the user portal 16, and can be executed and managed from the user portal 16 by a service delivery layer of the cloud services system 12 by appropriately accessing the continuous delivery system 14.

As a result, a cloud service provider can design and/or deploy a cloud service using the user portal 16 via the continuous delivery system 14 and publish the cloud service to the cloud services system 12 for access, consumption, and subscription management of the cloud service without requiring any knowledge of the implementation details of any hardware or software associated with the cloud services system 12, such as the location or configuration of any service offerings or databases accessible to a user of the cloud services system 12. In effect, the cloud service management system 18 can separate a delivery layer and a consumption layer associated with the cloud services system 12, such that the functions of the delivery layer and the consumption layer of the cloud services system 12 can be shared with the continuous delivery system 14 for purposes of designing, deploying, and publishing a cloud service (i.e., the continuous delivery system 14 can behave like a service provider for the cloud services system 12). Therefore, the cloud service management system 18 can be configured to launch a cloud service automatically from design to publication of service offering at a single user portal (e.g., the user portal 16). Accordingly, the cloud service management system 18 can be implemented to provide cloud service offerings (e.g., including configurable options, specifications, pricing, and/or policies) and subscription management capability associated with a respective cloud service directly to consumers by publishing designs of the cloud services system 12 and the continuous delivery system 14 with respect to the cloud service in a single package.

Figure 2:
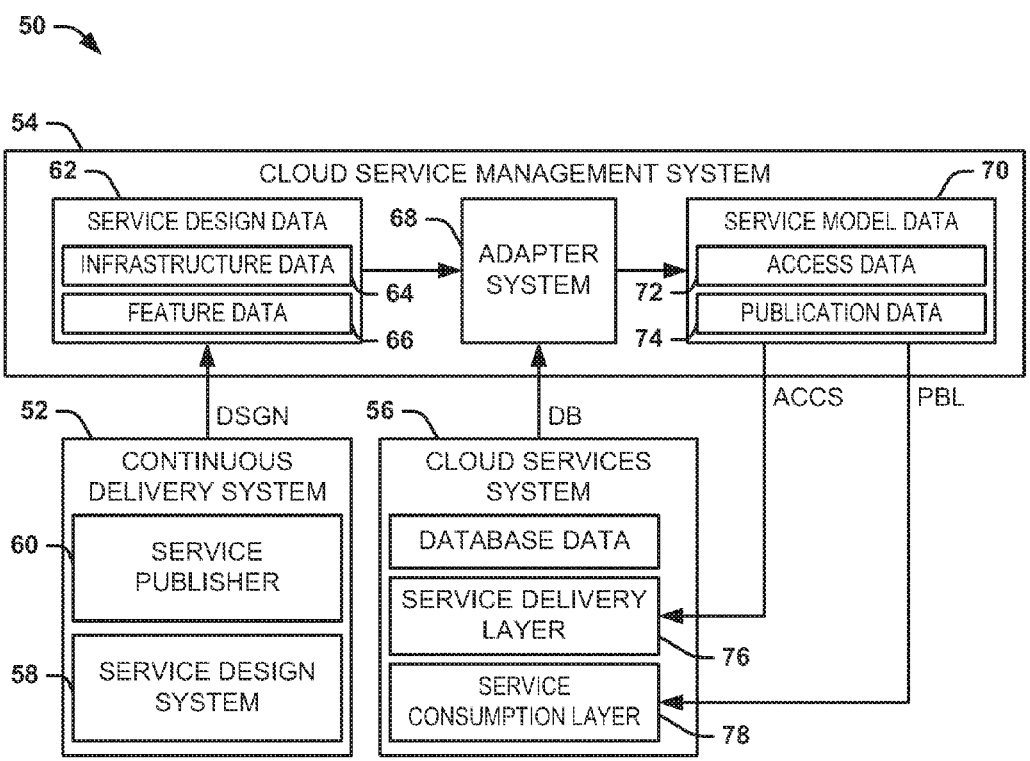
FIG. 2 illustrates an example of a portion of a cloud computing system.

FIG. 2 illustrates another example of a cloud computing system 50. The cloud computing system 50 includes a continuous delivery system 52, a cloud service management system 54, and a cloud services system 56 which can correspond respectively to the cloud services system 12, the continuous delivery system 14, and the cloud service management system 18 in the example of FIG. 1. Therefore, reference is to be made to the example of FIG. 1 in the following description of the example of FIG. 2.

The continuous delivery system 52 includes a service design system 58 and a service publisher 60. The service design system 58 is configured to allow a user to design a cloud service to be deployed in the cloud computing system 50, such as via a service portal (e.g., the service portal 16 in the example of FIG. 1). For example, the service design system 58 can be implemented to generate service design data that can include details regarding the network infrastructure corresponding at least in part to a service platform, (not shown) on which the cloud service is to be hosted. As described herein, the term "service platform" can refer to computer systems and/or any of a variety of types of hardware that can enable hosting of and consumption of data, software, and/or network resources, including one or more cloud services, such as can be accessed in the associated cloud computing system. For example, a service platform can include equipment capable of data storage, computation, network communication, load-balancing, and/or a variety of other data manipulation.

In addition, the service design data can also include design platform and application data, such as details regarding the operational software features of the cloud service, such as including the manner in which the cloud service is implemented as well as features that achieve the purpose of the cloud service, and thus the desired features for which consumers subscribe to the cloud service. The service publisher 60 is configured to provide the service design data to the service platform, such that the service platform can offer and/or orchestrate delivery of the cloud service. For example, the service design data can include infrastructure data corresponding to network parameters that can allow access and consumption of the cloud service from the service platform, such as via a service portal (not shown) across the cloud computing system 50 (e.g., via the Internet). The service publisher 60 can also publish the service design data to the cloud service management system 54.

The cloud service management system 54 can be implemented in a non-transitory computer readable medium, such as stored in and executed on a computer system that is coupled to the network on which the cloud computing system 50 is implemented. As an example, the associated computer system can be an enterprise system that is proximal to one or more user portals (e.g., one or both of an associated design portal(s) and/or service portal(s) that implement the features of the continuous delivery system 52 and/or the cloud services system 56, respectively, on the cloud computing system 50). For example, the associated computer system that hosts the cloud service management system 54 can be executed on a server system that hosts a local area network (LAN) that includes one or more user portal(s) which can be coupled to a wide area network (e.g., the Internet). As another example, the cloud service management system 54 can be implemented on an enterprise system that is located at a service provider, such that the cloud service management system 54 can be accessible via an associated user portal(s) via the Internet across the cloud computing system 50.

The cloud service management system 54 receives the service design data generated at the service design system 58 from the continuous delivery system 52, demonstrated in the example of FIG. 2 as via a data signal DSGN. The service design data, demonstrated in the example of FIG. 2 at 62, can be saved in a memory, such as in or coupled with the computer system that hosts the cloud service management system 54. The service design data 62 includes infrastructure data 64 and feature data 66. The infrastructure data 64 can include details regarding the service platform on which the cloud service is hosted, such as network parameters that can allow access and consumption of the cloud service from the service platform, such as via a service portal. The feature data 66 can include design platform and application data associated with operational software features of the cloud service, such as including the manner in which the cloud service is implemented and features that achieve the purpose of the cloud service, and thus the desired features for which consumers subscribe to the cloud service. The infrastructure data 64 and the feature data 66 can be provided in a communication protocol that corresponds to an interface layer of the continuous delivery system 52.

The cloud service management system 54 also includes an adapter system 68 that is configured to generate service model data 70 based on the service design data 62. As an example, the adapter system 68 can include one or more software adapters that are configured to translate the communication protocols of the interface layer associated with the continuous delivery system 52 into communication protocols associated with the cloud services system 56, such that the service design data 62 can be interpreted by the cloud services system 56. For example, the adapter system 68 can include internal resources, such as design reference identifiers that can indicate to the continuous delivery system 52 information that is requested for delivery (e.g., to the cloud services system 56). In addition, the adapter system 68 can include programmable parameters or resources that can be provided by a user (e.g., via the user portal) and/or a cloud service provider, such as system resource parameters (e.g., memory allocation, number of associated processors in the associated service platform, monitoring thresholds associated with application deployment parameters, etc.).

In the example of FIG. 2, the service model data 70 includes access data 72 that can correspond to the infrastructure data 64 and publication data 74 that can include the feature data 66. In the example of FIG. 2, it is demonstrated that the access data 72 and the infrastructure data 64 are different, and that the publication data 74 and the feature data 66 are different. However, it is to be understood that the access data 72 and the infrastructure data 64, as well as the publication data 74 and the feature data 66, can correspond to the same respective sets of data, but are demonstrated as separate to indicate separate ways of access and consumption of the respective sets of data based on the adapter system 68. In other words, the adapter system 68 can allow access of the service design data 62 by the cloud services system 56 via the translated communication protocols.

In addition, the publication data 72 can also include data associated with service offerings corresponding to the cloud service. The service offerings can include a variety of details regarding the cloud service, such as options, placement details, and/or restriction details, such as dictated by a service provider and/or vendor of the cloud service. For example, the adapter system 68 can receive database data via a data signal DB, such as via the cloud services system 56, that can indicate the location of one or more databases that can catalog the cloud service as the service offering, including the associated options and features, such that a user can access the database for selection of the service offering to access and consume the associated cloud service. Furthermore, parameters associated with the service offerings can also be provided in addition to or instead of the data signal DB as part of the feature data 66, such as provided by a user or cloud service provider (e.g., via the user portal).

Upon creation of the service model data 70, the cloud service management system 54 can provide the service model data 70 to the cloud services system 56. In the example of FIG. 2, the cloud service management system 54 can provide the access data 72 to a service delivery layer 76 of the cloud service system 56 via a data signal ACCS and can provide the publication data 74 to a service consumption layer 78 of the cloud service system 56 via a data signal PBL. As an example, the service delivery layer 76 can be configured to implement network details associated with the delivery of the cloud service through the cloud computing system 50, such as based on dictating backend configuration, placement, and/or reservation of the cloud service, as well as the network location and access details regarding the service platform on which the cloud service is hosted. As another example, the service consumption layer 78 can be configured to implement details regarding the manner in which the cloud service can be consumed by a user, such as via a service portal, and can control aspects of the consumption of the cloud service, such as approval, pricing, and life-cycle of the service offering associated with the cloud service.

The service consumption layer 78 can include one or more databases that are implemented via access of the cloud services system 56, such that provisioning of the publication data 74 to the service consumption layer 78 can include publication of the associated service offering(s) regarding the cloud service to the database(s). As an example, the database(s) can each be accessible via one or more catalogs that provide the service offering(s) associated with the cloud service to a consumer, as well as all relevant options and features that can be selected by the consumer, such as via a service portal. For example, a user can access the catalog(s) via the service portal in the cloud computing system 50 to browse amongst a plurality of service offerings and associated features and options, and can select one or more of the service offerings for consumption of the associated cloud services via the associated database(s). In the example of FIG. 2, the cloud services system 56 includes database data 80 that corresponds to data associated with locations and entries of the database(s) in the cloud computing system 50. The cloud services system 56 can thus provide the database data 80 to the adapter system 68 via the data signal DB, such as in response to a request for the database data 80 when the adapter system 68 generates the service model data 70. As another example, the database data 80 can be updated to reflect changes to the catalog(s) stored in the respective database(s), such as in response to the cloud service management system 54 providing the publication data 74 to the service consumption layer 78. Accordingly, the adapter system 68 can implement the updated database data 80 in the future generation of service model data 70.

As a result of the cloud service management system 54 implementing the adapter system 68 to generate the service model data 70, the functions of the continuous delivery system 52 and the cloud services system 56 are effectively integrated. Therefore, a user or a cloud service provider can implement a user portal, such as a design portal, to design, deploy, and automatically publish a cloud service as one or more service offerings agnostically with respect to the protocols and databases associated with the cloud services system 56. Typical continuous delivery systems may require knowledge of specific details of associated cloud services system(s) to incorporate callbacks to the service platform from specific databases and service portals. However, a designer that implements the cloud service management system 54 in designing cloud services can design a cloud service with substantially no knowledge of the interfaces associated with the cloud services system 56 or the existing database systems and service portals from which the catalogs of existing service offerings can be accessed, as all the callbacks to the service platform are integrated by the cloud service management system 54.

Figure 3:
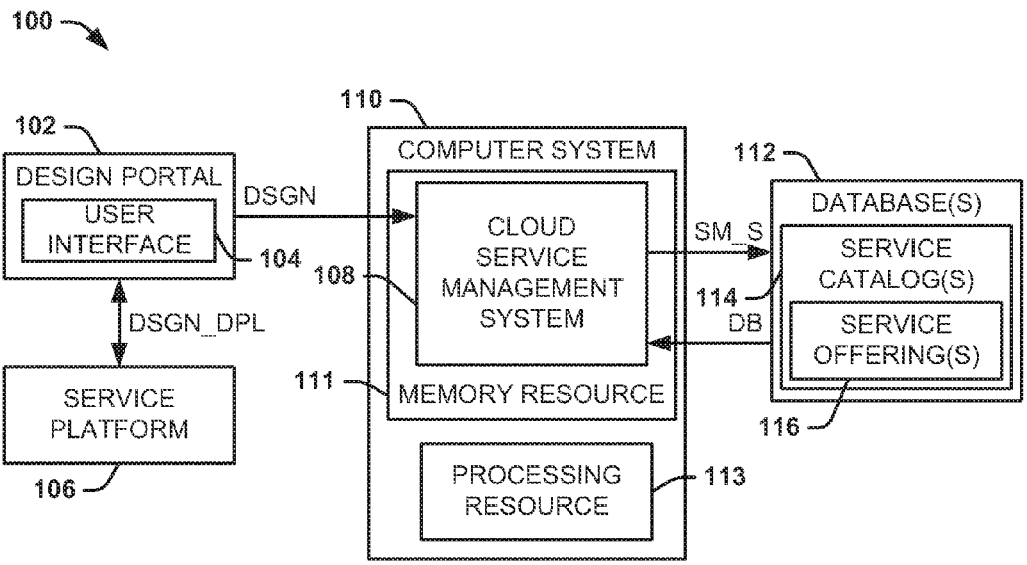
FIG. 3 illustrates another example of a portion of a cloud computing system.

FIG. 3 illustrates yet another example of a cloud computing system 100. The cloud computing system 100 includes a user portal 102 having a user interface 104 through which a user or a cloud service provider can design and deploy a cloud service, such as by implementing a continuous delivery system (e.g., the continuous delivery system 52 in the example of FIG. 2). As an example, the user portal 102 can include a local user workstation that includes the user interface 104. As another example, the user portal 102 can correspond to a remote design service that can be accessed at a local workstation that includes the user interface 104. The user or cloud service provider can deploy the cloud service via the user portal 102 to a service platform 106, demonstrated in the example of FIG. 3 as via a data signal DSGN_DPL, such as by implementing a continuous delivery system (e.g., the continuous delivery system 52 in the example of FIG. 2). For example, the service platform 106 can include one or more local computer systems, such as including the user portal 102, or can include an enterprise system on a LAN or a computer system that is communicatively coupled with the user portal 102 via a network (e.g., the Internet).

Upon or substantially concurrently with deployment of the cloud service to the service platform 106, the user portal 102 can transmit service design data DSGN to a cloud service management system 108, which can be implemented as machine readable instructions, is provided on a computer system 110. As an example, the computer system 110 can be located proximal with respect to one or both of the user portal 102 and the service platform 106, or can be located remotely, such as part of a service provider's enterprise system. As another example, the computer system 110 can include a single computer or a distributed set of computing devices, such as distributed across a network. The computer system 110 can include, for example a memory resource 111 that can store machine readable instructions, including the cloud service management system 108. The memory resource 111 can be implemented, for example, as a volatile memory (e.g., random access memory), non-volatile memory (e.g., a hard drive, a solid state drive, flash memory, etc.). Moreover, the computer system 110 can include a processing resource 113 (e.g., a processor core) to access the memory resource 111 and execute the machine readable instructions. Moreover, in the present examples, the memory resource 111 and the processing resource 113 could be stored a single machine (e.g., a computer) or across multiple computers (via a network). The cloud service management system 108 can be configured substantially similar to the cloud service management system 54 in the example of FIG. 2. Therefore, the service design data DSGN can be substantially similar to the service design data 62, and can thus include infrastructure data and feature data. The cloud service management system 108 can thus translate the service design data DSGN into service model data, such as via an adapter system, similar to as described regarding the example of FIG. 2. The service model data, which can include access data and publication data, can thus be provided to a service delivery layer and a service consumption layer of an associated cloud services system, similar to as described regarding the example of FIG. 2.

In the example of FIG. 3, the cloud computing system 100 includes one or more databases 112 that are communicatively coupled with the cloud service management system 108. The database(s) 112 can be associated with a service consumption layer of a cloud services system (e.g., the cloud services system 56 in the example of FIG. 2). The database(s) can be stored, for example, in the service providers enterprise system, as part of the computer system 110, as part of the service platform 106, or in a variety of other memory systems, and can be distributed across a plurality of remote memory systems. In the example of FIG. 3, the database(s) 112 can each be configured to store one or more service catalogs 114 that each provide one or more service offerings 116. However, it is to be understood that the database(s) 112 and the service catalog(s) 114 can be provided and/or stored separately with respect to each other. The service offering(s) 116 can each correspond to a cloud service, such as based on the publication data generated by the cloud service management system 108. For example, the service offering(s) 116 can each include a base service, premier service(s), features, options, and/or a variety of other choices that can be selected for consumption of the associated cloud service by a user. The user can access the database(s) 112 via a service portal across the cloud computing system 100 to browse and/or select the desired service offering(s) 116.

As described previously, the cloud service management system 108 can provide the service model data to a service delivery layer and a service consumption layer of an associated cloud services system. The publication of the service model data to the associated cloud services system can include publication of the service offering(s) associated with the cloud service to the database(s) 112, demonstrated in the example of FIG. 3 as via a data signal SM_S. The service catalog(s) 114 can thus be updated to include the service offering(s) associated with the cloud service with the existing service offering(s) 116 that are stored in the database(s) 112. As a result, the user can access the database(s) 112 via the service portal across the cloud computing system 100 to browse and/or select the service offering(s) associated with the cloud service. In response to selection of the service offering(s), the service portal can be communicatively coupled with the service platform 106 to access and consume the associated cloud service, such as based on the access data that can be provided to service platform (e.g., via the database(s) 112). Furthermore, the database(s) 112 can provide a data signal DB to the cloud service management system 108 in response to publication of the service offering(s) associated with the cloud service. Accordingly, the cloud service management system 108 can include knowledge of the existing entries and structures of the database(s) 112 for generating future iterations of service model data, such as described in the example of FIG. 2.

Figure 4:
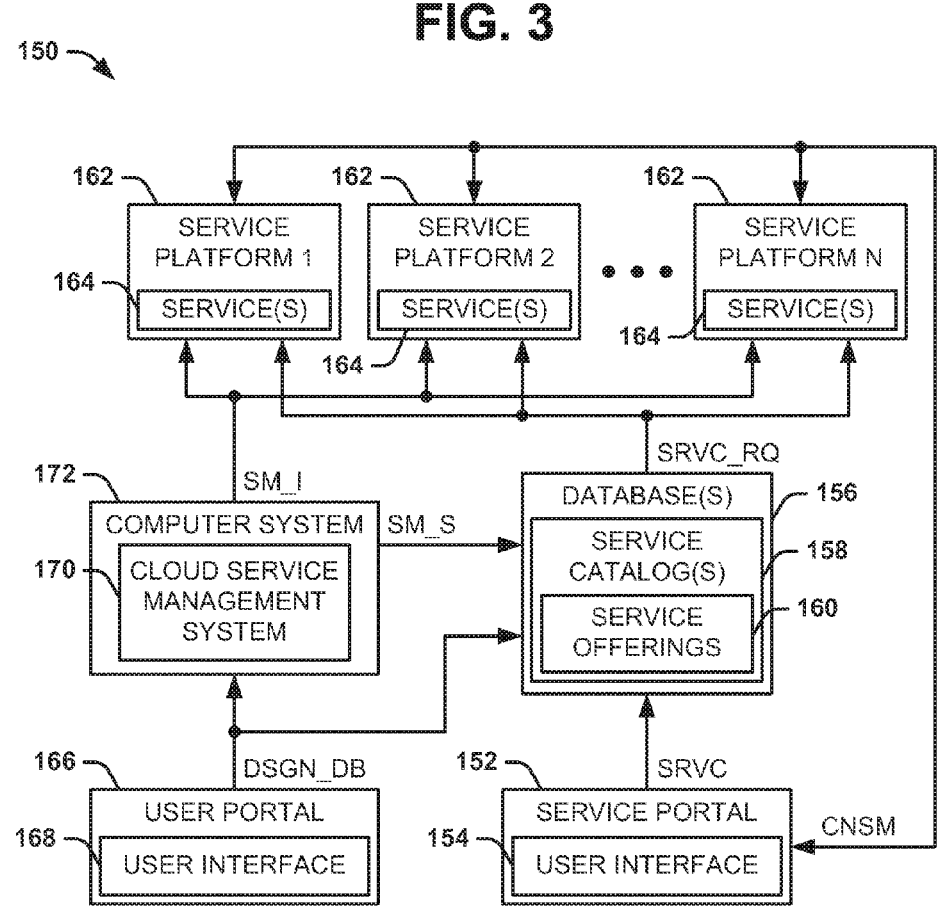
FIG. 4 illustrates yet another example of a portion of a cloud computing system.

FIG. 4 illustrates yet a further example of a cloud computing system 150. The cloud computing system 150 can be configured substantially similar to the cloud computing systems 50 and 100 in the examples of FIGS. 2 and 3, respectively. The cloud computing system 150 includes a service portal 152 that implements and/or corresponds to a cloud services system and has a user interface 154 through which a user can access one or more database(s) 156 via a data signal SRVC. As an example, the service portal 152 can include a local user workstation that includes the user interface 154. As another example, the service portal 152 can correspond to a remote design service that can be accessed at a local workstation that includes the user interface 154. The database(s) 156 can each be configured to store one or more service catalogs 158 that each provide one or more service offerings 160. The service offerings 160 can each correspond to at least one cloud service.

For example, the service offerings 160 can each include a base service, premier service(s), features, options, and/or a variety of other choices that can be selected for consumption of the associated cloud service by a user. As another example, upon a user selecting a service offer, such as including subscription details that are handled by a continuous delivery system (e.g., such as via the continuous delivery system 52 in the example of FIG. 2), corresponding delivery functions associated with the continuous delivery system can be triggered. While the example of FIG. 4 demonstrates access of the service offerings 160 via the service portal 152, a user is not limited to accessing the cloud computing system 150 via the service portal 152. Instead, a user can programmatically access portions of the cloud computing system 150, such as the service offerings 160, via APIs.

In response to selecting a given one or more of the service offerings 160, the database(s) 156 can signal one or more of a plurality N of service platforms 162, where N is a positive integer, via a data signal SRVC RQ. Each of the service platforms 162 can be configured to provide one or more cloud services 164, such that the cloud services 164 have been deployed to the respective service platforms 162 (e.g., such as via the continuous delivery system 52 in the example of FIG. 2). As another example, a given cloud service can be provided across more than one of the service platforms 162. Each of the cloud services 164 can be included as one or more of the service offerings 160. The signaling of the service platform(s) 162 can occur based on providing the service portal 152 (e.g., via the database(s) 156) with the requisite access data (e.g., via the service delivery layer of the associated cloud services system) of the respective service platform(s) 162. As another example, the service platform(s) 162 can be provided with network information regarding the service portal 152 (e.g., via the database(s) 156), such that the service platform(s) 162 can contact the service portal 152. Upon network communication between the service portal 152 and the respective one or more service platforms 162, the user can access and consume the cloud service(s) 164 associated with the requested service offering(s) 160 via a data signal CNSM.

The cloud computing system 150 also includes a user portal 166. The user portal 166 includes a user interface 168 through which a user or a cloud service provider can design and deploy cloud services via a continuous delivery system, as described in greater detail herein. For example, the user portal 166 can be implemented for cloud service design using one or both of a cloud services system or a continuous delivery system (e.g., the cloud services system 56 or the continuous delivery system 52 in the example of FIG. 2, respectively). In addition, a cloud service provider can implement changes to existing cloud services, such as via a cloud services system. For example, the cloud service provider can access the database(s) 156 using the cloud services system to update, add, remove, or otherwise alter one or more of the catalog(s) 158 or service offerings 160 via a data signal DSGN_DB that includes service change data. Upon implementing the changes to the cloud services, the service change data in the data signal DSGN_DB can also be provided to a cloud service management system 170 that is hosted on a computer system 172. The cloud service management system 170 can be configured substantially similar to the cloud service management systems 54 and/or 108 in the examples of FIGS. 2 and 3, respectively.

As an example, the service change data in the data signal DSGN_DB can be provided in a communication protocol that is associated with an interface layer of the cloud services system. Upon the cloud service management system 170 receiving the service change data in the data signal DSGN_DB, the cloud service management system 170 can translate the service change data into service design data, such as the service design data 62 that includes infrastructure data and feature data. For example, the cloud service management system 170 can implement an adapter system to translate the service change data from the communication protocols associated with the cloud services system interface to communication protocols associated with the continuous delivery system interface. Thus, the cloud service management system 170 can access the service platform(s) 162 on which the respective cloud service(s) 164 are hosted via a data signal SM_I to implement the changes to the respective service design data. In addition, the cloud service management system 170 can provide relevant data regarding the changes to the respective service platform(s) 162 to the database(s) 156 via a data signal SM_S, such as including changes to call back data regarding access of the respective service platform(s) 162 hosting the cloud service(s) 164 that correspond to the associated service offerings 160.

Accordingly, in the example of FIG. 4, a cloud service provider can implement the user portal 166 to change existing cloud services 164 using the cloud services system for integration with the continuous delivery system, as opposed to using the continuous delivery system for integration with the cloud services system, as demonstrated in the examples of FIGS. 2 and 3. In other words, the cloud service management system 170 can be implemented for bidirectional integration between the cloud service system and the continuous delivery system regarding the design and change of cloud services.

Figure 5:
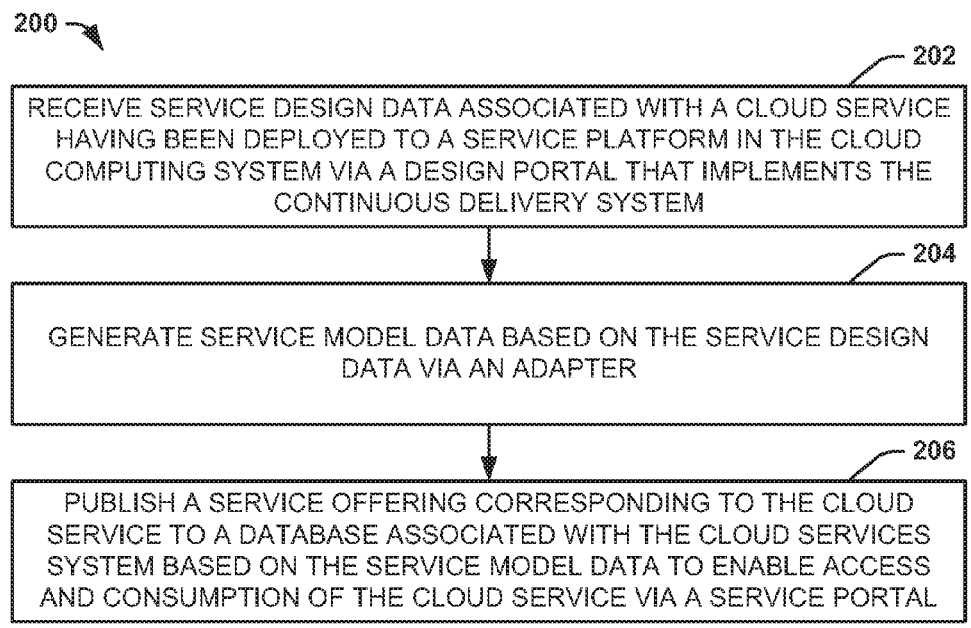
FIG. 5 illustrates an example of a method for integrating a continuous delivery system with a cloud services system in a cloud computing system.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example method of FIG. 5 can be implemented as machine-readable instructions that can be stored in a non-transitory computer readable medium, such as can be computer program product or other form of memory storage. The computer readable instructions corresponding to the method of FIG. 5 can also be accessed from memory and be executed by a processor (e.g., a processing unit of the computer systems 110 and/or 172 of FIGS. 3 and 4, respectively).

FIG. 5 illustrates an example of a method 200 for integrating a continuous delivery system with a cloud services system in a cloud computing system. At 202, service design data (e.g., the service design data 62) associated with a cloud service having been deployed to a service platform (e.g., the service platform 106) in the cloud computing system (e.g., the cloud computing systems 50, 100, and/or 150) is received via a user portal (e.g., the user portal 102) that implements the continuous delivery system (e.g., the continuous delivery system 52). At 204, service model data (e.g., the service model data 70) is generated based on the service design data via an adapter (e.g., the adapter system 68). At 206, a service offering (e.g., the service offering(s)

116) corresponding to the cloud service is published to a database (e.g., the database(s) 112) associated with the cloud services system (e.g., the cloud services system 56) based on the service model data to enable access and consumption of the cloud service via a service portal (e.g., the service portal 152).

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but is not limited to, and the term "including" means including but is not limited to. The term "based on" means based at least in part on.

What is claimed is:

1. A cloud computing system comprising:
    a continuous delivery system to enable design and deployment of a cloud service in the cloud computing system;
    a cloud services system to enable access and consumption of a service offering associated with the cloud service by a user;
    a cloud service management system that is executed on a non-transitory computer readable medium, the cloud service management system to integrate the continuous delivery system and the cloud services system over the cloud computing system to provide the design and the deployment of the cloud service and publication of the cloud service to the cloud services system,
    wherein the cloud service management system comprises an adapter system to generate service model data associated with accessibility of the cloud service based on service design data associated with the deployment of the cloud service via a software adapter associated with protocols of the continuous delivery system and the cloud services system, and
    wherein the service design data comprises infrastructure data associated with host configuration of the cloud service and feature data corresponding to features of the cloud service, the cloud service management system to translate the infrastructure data into access data for a service delivery layer of the cloud services system and to translate the feature data into publication data for publication of the cloud service into a service consumption layer of the cloud services system based on database data corresponding to an existing cloud service.

2. The system of claim 1, wherein the continuous delivery system comprises:
    a service design system to generate the service design data associated with the design of the cloud service via a user portal; and
    a continuous delivery service publisher to publish the service design data to the cloud service management system and to a service platform to host the cloud service.

3. The system of claim 2, wherein the user portal is further to interact with a graphical user interface communicatively coupled to a service platform that hosts the cloud service designed and deployed by the continuous delivery system to implement the continuous delivery system.

4. The system of claim 3, wherein the user portal is further to initiate changes to the cloud service based on accessing the cloud service at the service platform via the cloud service management system based on infrastructure data stored on the cloud service management system.

5. The system of claim 2, wherein the user portal comprises a user interface to enable at least one of the user and a cloud service provider to browse a service catalog, order the service offering associated with the service catalog, deploy the cloud service as the respective service offering, and manage a subscription associated with the cloud service.

6. The system of claim 1, further comprising:
    a database that comprises a service catalog to store the service offering associated with the cloud service, the cloud service management system being to generate the service offering and to publish the service offering to the database based on service design data generated by the continuous delivery system; and
    a service portal corresponding to the cloud services system to access the database for selection of the service offering from the service catalog via a user interface to enable the access and the consumption of the service offering.

7. The system of claim 6, wherein the cloud service management system is to associate access data corresponding to a service platform that hosts the cloud service with the service offering upon publishing the service offering to the database, the service portal being to access the service platform to consume the cloud service in response to selection of the service offering from the catalog.

8. The system of claim 6, wherein upon the service offer being selected via the user interface, subscription instructions associated with the cloud service are executed to provide delivery functions associated with the continuous delivery system for delivery of the cloud service and to provide subsequent lifecycle management of an element of the cloud service.

9. The cloud computing system of claim 1, wherein the continuous delivery system, the cloud services system, and the cloud service management system are separate systems,
    wherein the continuous delivery system is not part of the cloud services system or the cloud service management system,
    wherein the cloud services system is not part of the continuous delivery system or the cloud service management system,
    and wherein the cloud service management system is not part of the continuous delivery system or the cloud services system.

10. The cloud computing system of claim 1, wherein the cloud service management system provides for design and deployment of the cloud service via the continuous delivery system, and publication of the cloud service to the cloud services system for access and consumption of the cloud service, without knowledge of implementation details of hardware and software associated with the cloud services system.

11. The cloud computing system of claim 1, wherein the cloud service management system provides for design and deployment of the cloud service via the continuous delivery system agnostically with respect to protocols and databases associated with the cloud services system.

12. The cloud computing system of claim 1, wherein the cloud management system is to integrate the continuous delivery system and the cloud services system by:

translating service design data to service model data via an adapter based on separate protocols associated with the continuous delivery system and the cloud services system;

publishing a service offering associated with the cloud service to a database based on the service model data; and associating access data corresponding to a service platform with the service offering upon publishing the service offering to the database.

13. The cloud computing system of claim 12, wherein the continuous delivery system generates the service design data, and wherein the cloud services system comprises the database and the service platform.

14. A non-transitory computer readable medium storing program code executable by a cloud service management system to integrate a continuous delivery system with a cloud services system in a cloud computing system by:

receiving service design data associated with a cloud service having been deployed to a service platform in the cloud computing system via a user portal that implements the continuous delivery system;

generating service model data based on the service design data via an adapter; and publishing a service offering corresponding to the cloud service to a database associated with the cloud services system based on the service model data to enable access and consumption of the cloud service via a service portal, wherein generating the service model data comprises translating the service design data into the service model data via the adapter based on separate protocols associated with the continuous delivery system and the cloud service system.

15. The medium of claim 14, wherein receiving the service design data comprises receiving infrastructure data associated with host configuration of the cloud service and receiving feature data corresponding to features of the cloud service;

wherein generating the service model data comprises generating access data corresponding to the infrastructure data and generating publication data corresponding to the feature data; and wherein publishing the service offering comprises providing the access data to a service delivery layer of the cloud services system and providing the publication data to a service consumption layer of the cloud services system based on database data corresponding to an existing cloud service.

16. The medium of claim 14, wherein the program code is executable by the cloud service management system to integrate the continuous delivery system with the cloud services system by further:

associating access data corresponding to the service platform that hosts the cloud service with the service offering upon publishing the service offering to the database; and accessing the service platform to enable consumption of the cloud service in response to selection of the service offering from the catalog at the service portal.

17. A cloud computing system comprising:

a continuous delivery system comprising a user portal to generate service design data corresponding to design and deployment of a cloud service on a service platform in the cloud computing system;

a cloud services system comprising:

a service platform to enable access and consumption of the cloud service from the service platform by a user;

a database communicatively coupled to the service platform to enable selection of a service offering corresponding to the cloud service; and a cloud service management system that is executed on a non-transitory computer readable medium, the cloud service management system to:

integrate the continuous delivery system and the cloud services systems by translating the service design data to service model data via an adapter based on separate protocols associated with the continuous delivery system and the cloud services system, a service offering associated with the cloud service to the database based on the service model data, and access data corresponding to the service platform with the service offering upon publishing the service offering to the database, wherein the service design data comprises infrastructure data associated with host configuration of the cloud service and feature data corresponding to features of the cloud service, the cloud service management system to translate the infrastructure data into access data for a service delivery layer of the cloud service system and to translate the feature data into publication data for publication of the cloud service into a service consumption layer of the cloud services system based on database data corresponding to an exiting cloud service.

* * * * *